June 9, 1931. R. A. CREBER 1,809,111
VEHICLE BRAKE
Filed Nov. 8, 1929
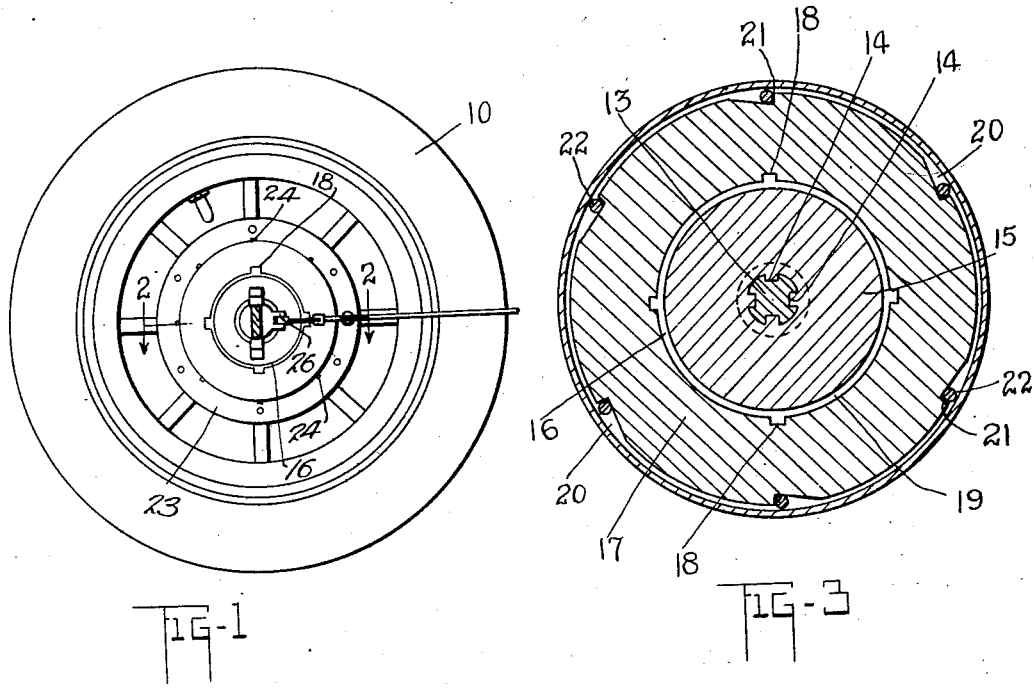
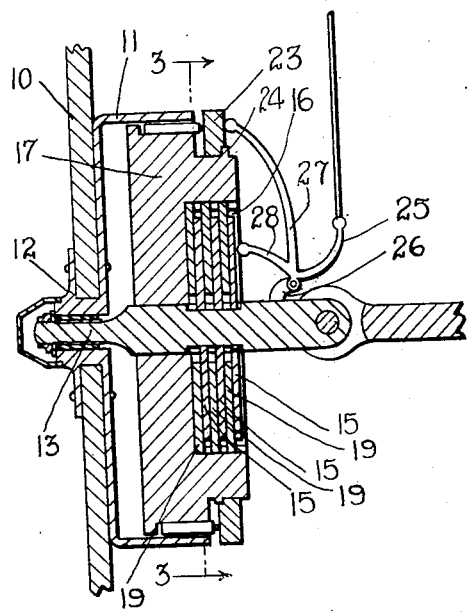
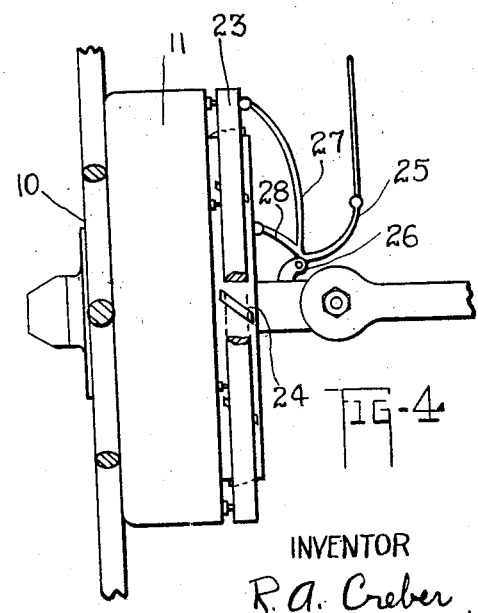
INVENTOR
R. A. Creber
BY E. J. Fetherstonhaugh
ATTORNEY.

Patented June 9, 1931

1,809,111

UNITED STATES PATENT OFFICE

ROY ARTHUR CREBER, OF TORONTO, ONTARIO, CANADA

VEHICLE BRAKE

Application filed November 8, 1929. Serial No. 405,664.

The invention relates to a vehicle brake as described in the present specification and illustrated in the accompanying drawings which form part of the same.

The invention consists essentially of the novel features of construction pointed out broadly and specifically in the claims for novelty following a description containing an explanation in detail of an acceptacle form of the invention.

The objects of the invention are to devise a brake for vehicles and general machinery that will form an even pressure on the wheel or other rotating part and act as a powerful stoppage for the wheel; to avoid the endless adjustments of the brakes as at present is the case and eliminate the danger of the locking of the four-wheel brakes as so often occurs on the quick application of the brakes in an emergency; to simplify the various parts of a brake mechanism and to construct such parts together as to be freely accessible at all times; to form an even wearing surface throughout the brake mechanism and generally provide an efficient brake that is durable in construction, comparatively cheap to manufacture and comparatively easy to instal in a vehicle and other machinery where quick application of stopping the rotary member is required.

In the drawings, Figure 1 is a side elevation of the brake as applied to a front wheel vehicle.

Figure 2 is a cross sectional view of the brake mechanism taken on the lines 2—2 in Figure 1.

Figure 3 is a side sectional view of the brake mechanism showing the locking member having the rollers.

Figure 4 is an end elevation of the vehicle brake.

Like numerals of reference indicate corresponding parts in the various figures.

Referring to the drawings, the brake for better explanation is shown as applied to the front wheel of the vehicle, but it may be here mentioned that a similar brake can be applied at the rear wheels by slight modification of the controlling members. The front wheel of the vehicle as indicated by the numeral 10 has a brake drum 11 rigidly bolted to the hub 12 of the wheel. This brake drum is journalled from the hub 12 to the axle 13.

This axle 13 has a plurality of key ways 14 in which are secured a corresponding number of clutch plates 15 secured therein and are enclosed in the recess 16 of a locking member 17 journalled on the axle and having key ways 18 in its recess 16 from which extends a plurality of clutch plates 19 interspacing with the clutch plates 15 of the axle 13.

The locking member 17 has around its circumference a plurality of slots 20 in the form of angles 21 and in which are a plurality of rollers 22 journalled in a ring 23 supported in guides 24 on the locking member.

The circumference of the locking member is adjacent to the inner surface of the brake drum and the slots 20 have the outer portion of their angles 21 merging outwardly so that upon movement of the rollers they will engage with the inner surface of the drum. The controlling means for operating the locking member and clutch plates may be varied according to the requirements, but it is here shown in the form of a braking lever 25 journalled in the bracket 26 and secured to the axle and which project the abutting levers 27 and 28, one engaging with the ring forming the journal member for the rollers and the other engaging with the clutch plates of the locking member and axle.

In the operation of the invention, upon application of the foot pedal, a pressure is exerted by means of the aforementioned levers on to the ring which forms the journal member for the rollers and at the same time against the clutch plates, and this has the effect of bringing the rollers forward on the angle portion of the slots and to jam against the inner surface of the brake drum. At the same time the lever presses against the clutch plates, that is to say, between the plates projecting from the locking member and the plates projecting from the axle, thereby bringing the two sets of plates into friction which retards the speed of the vehicle, in other words, the actual pressure is formed by the rollers against the brake drum and the adjustment of the pressure is caused through the operation of the clutch plates.

It will be seen that slight modifications may be made to meet with the various changes and that this brake mechanism is not at all confined for the use of vehicles only.

What I claim is:

1. In a vehicle brake, a wheel having a hub and a brake drum rigidly secured to said hub, an axle engaging with said hub and forming a journal for a locking member within said brake drum, and means for stopping the rotation of said wheel by engagement of said locking member with said drum, and means in said locking member and spaced from said axle to form an adjustment for the speed of engagement between said brake drum and locking member, and means for controlling said locking and adjusting means.

2. In a vehicle brake, a wheel having a brake drum rigidly secured thereto and an axle forming a journal for said drum and wheel, a locking member within said brake drum having a plurality of slots around its circumference and adjacent to the inner surface of said drum, a ring mounted in a channel of said locking member and having a plurality of rollers slidably arranged within the slots of said locking member, a set of clutch plates secured in a recess of said locking member and interspaced with a set of clutch plates secured to said axle and means of controlling the movements of said rollers and said clutch plates.

3. In a vehicle brake, a wheel having a brake drum rigid therewith, an axle forming a journal for said drum and wheel, said axle having a plurality of key ways and a set of clutch plates projecting therefrom and secured therein, a locking member journalled on said axle and having a recess for receiving the clutch plates for said axle and interspacing the same with a plurality of clutch plates of its own, said locking member having around its circumference a plurality of slots in the form of angles, a plurality of rollers journalled in a ring slidably mounted on said locking member and adapted upon pressure to come into engagement with the inner surface of said brake drum, and means for operating said rollers and said clutch plates.

Signed at the city of Toronto, this 7th day of October, 1929.

ROY ARTHUR CREBER.